United States Patent [19]

Tiegs et al.

[11] Patent Number: 4,930,261

[45] Date of Patent: Jun. 5, 1990

[54] VALVE RESURFACING APPARATUS AND METHOD FOR MAKING THE SAME

[75] Inventors: Mark D. Tiegs; Michael J. Kurten, both of Winona, Minn.

[73] Assignee: Hein-Werner Corporation, Waukesha, Wis.

[21] Appl. No.: 404,058

[22] Filed: Sep. 6, 1989

Related U.S. Application Data

[63] Continuation of Ser. No. 160,128, Feb. 25, 1988, abandoned.

[51] Int. Cl.$^5$ .............................................. B23C 3/05
[52] U.S. Cl. ................................. 51/105 VG; 269/24; 279/1 DC; 279/75; 279/82
[58] Field of Search ......... 51/105 VG, 216 R, 216 T, 51/217 R, 217 J, 236, 237; 279/1 DC, 4, 75, 74, 82 R; 81/177.85, 53.2; 269/24, 48.3

[56] References Cited

U.S. PATENT DOCUMENTS

| | | | |
|---|---|---|---|
| 2,778,163 | 1/1957 | Flygare | 51/105 VG |
| 3,029,564 | 4/1962 | Humbert | 51/105 VG |
| 4,126,066 | 11/1978 | Wagor et al. | 82/4 A |
| 4,228,621 | 10/1980 | Wagor | 51/241 |
| 4,302,882 | 12/1981 | Bradley et al. | 33/180 B |
| 4,452,111 | 6/1984 | Anderson | 82/4 A |

Primary Examiner—Frederick R. Schmidt
Assistant Examiner—M. Rachuba
Attorney, Agent, or Firm—Michael, Best & Friedrich

[57] ABSTRACT

An apparatus for engaging the stem of a valve member and for rotating the valve member about an axis, the apparatus comprising a sleeve member supported for rotation about an axis, the sleeve member having therein a cylindrical bore centered on the axis and machined by rotating the sleeve member about the axis, a spindle slideably housed within the bore for movement relative to the sleeve member along the axis, the spindle including an inner surface defining a frustoconical bore centered on the axis, the inner surface being machined by rotating the spindle in the sleeve and about the axis, a collar mounted on the sleeve member and including a second inner surface defining a second frustoconical bore centered on the axis, the second inner surface being machined by rotating the sleeve member and the collar about the axis, a first set of balls located within the bore and supported for radial movement relative to the sleeve member and for engagement with the spindle inner surface, a second set of balls located within the bore and supported for radial movement relative to sleeve member and for engagement with the second inner surface, a mechanism for moving the spindle relative to the sleeve member and along the axis so that the spindle inner surface engages the first set of balls and so that the collar inner surface engages the second set of balls, and a mechanism for rotating the spindle about the axis.

30 Claims, 3 Drawing Sheets

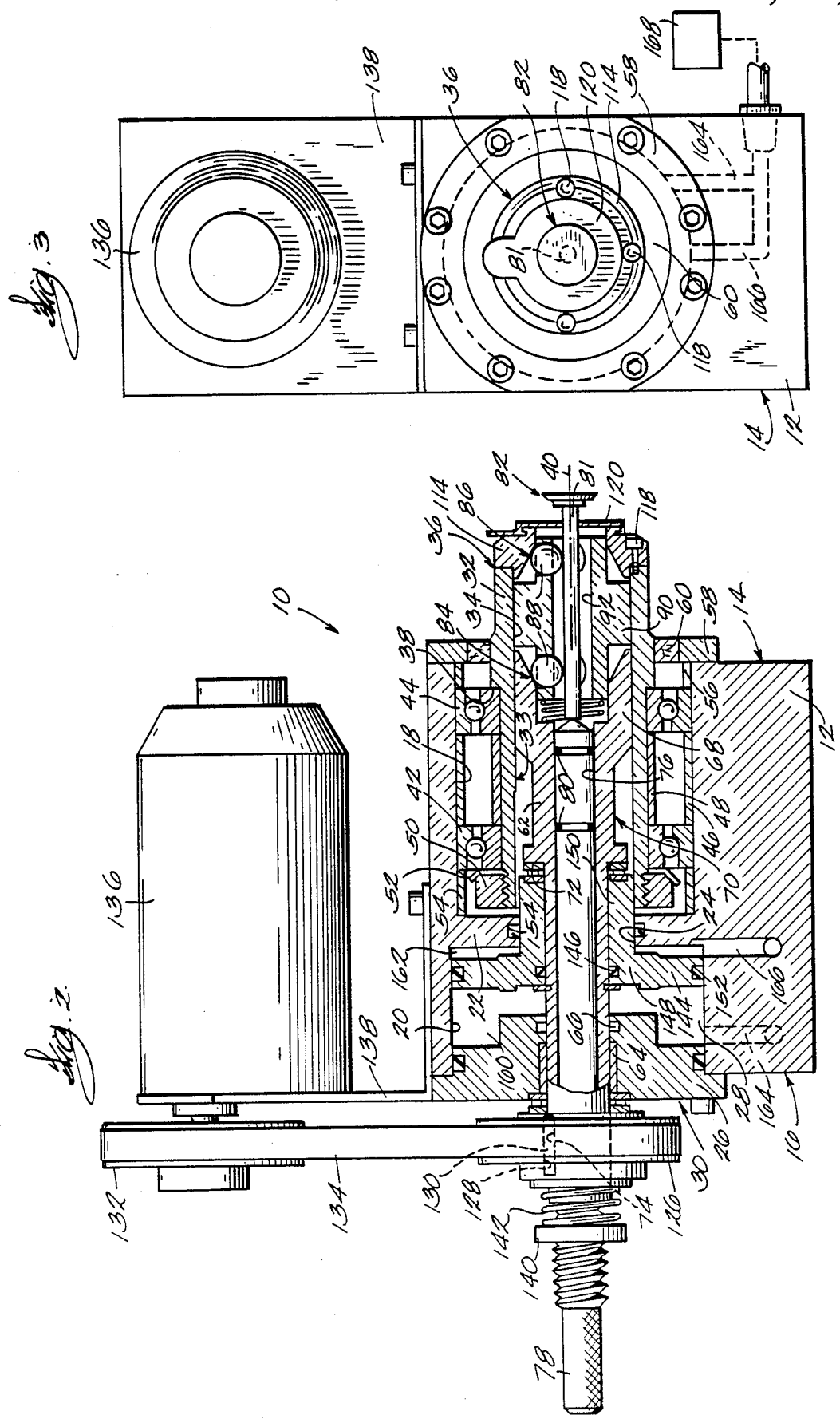

VALVE RESURFACING APPARATUS AND METHOD FOR MAKING THE SAME

This is a continuation of U.S. patent application Ser. No. 160,128, filed Feb. 25, 1988 now abandoned.

BACKGROUND OF THE INVENTION

The invention relates to apparatus for resurfacing automotive valves, and more particularly to chuck assemblies for such apparatus.

A typical valve resurfacing apparatus includes a chuck assembly for rotating a valve about its longitudinal axis, and a grinding wheel for resurfacing the valve. See, for example, U.S. Pat. No. 4,228,621, issued Oct. 21, 1980.

If the chuck assembly does not rotate the valve exactly about its longitudinal axis, i.e., if the axis of rotation of the valve is not coincident with the longitudinal axis of the valve, the end of the valve will wobble. This is known as "run-out." Known chuck assemblies for use in valve resurfacing have run-out of at least 0.0006 to 0.0009 inches.

Also, known chuck assemblies tend to wear out relatively quickly. When these chuck assemblies wear out, the critical parts must be returned to the manufacturer to be rebuilt.

SUMMARY OF THE INVENTION

The invention provides a valve resurfacing apparatus including a chuck assembly that in initial testing has had run-out of approximately 0.0002 inches. This is substantially lower than the run-out of prior art valve resurfacing machines. Also, the chuck assembly of the invention is more easily and less expensively serviced than the chuck assemblies of the prior art.

More particularly, the invention provides a chuck assembly comprising a housing, an annular sleeve member including an inner surface defining a generally cylindrical bore, and bearing means supporting the sleeve member within the housing for rotation about an axis. The inner surface of the sleeve member is machined or ground to its final dimensions by rotating the sleeve member while it is supported in the housing by the bearing means. As a result, the inner surface of the sleeve member is precisely centered on the axis of rotation of the sleeve member.

A plunger or spindle is slideably housed within the sleeve member bore and is moveable relative to the sleeve member along the axis of rotation of the sleeve member. The spindle includes a portion having an outer diameter substantially equal to the inner diameter of the sleeve member bore, so that the spindle does not wobble relative to the sleeve member. The spindle also includes an inner surface defining a frustoconical bore in the spindle. The inner surface of the spindle is machined to its final dimensions while the spindle is supported within the sleeve member and the sleeve member and spindle are rotated within the housing. Therefore, the inner surface of the spindle is centered on the axis of rotation of the sleeve member.

Means are also provided for moving the spindle axially relative to the sleeve member. Preferably, this means includes a piston mounted on the spindle and housed within a cylinder defined by the housing. The piston is moved within the cylinder, and thus the spindle is moved relative to the sleeve member, by supplying compressed air to the cylinder.

An annular collar is mounted on the end of the sleeve member. The collar includes an inner surface facing the spindle inner surface and defining a frustoconical bore in the collar. The inner surface of the collar is machined to its final dimensions while the collar and sleeve member are rotated within the housing, so that the inner surface of the collar is centered on the axis of rotation of the sleeve member.

A ball carriage is slideably housed within the sleeve member bore between the spindle and the collar. The ball carriage includes an axial bore adapted to house the stem of a valve, and the ball carriage supports first and second sets of balls for engagement by the spindle inner surface and the collar inner surface, respectively. Each set of balls is circumferentially spaced around the sleeve member axis and each ball is supported by the ball carriage for radial movement relative to the sleeve member. When the spindle is moved relative to the sleeve member and toward the collar, the spindle inner surface and the collar inner surface respectively engage the first and second sets of balls and move the balls radially inwardly.

A valve is inserted into the chuck assembly by inserting the stem of the valve through the collar and into the ball carriage bore. The valve stem is secured in the chuck assembly by moving the spindle toward the collar so that the spindle inner surface and the collar inner surface respectively engage the first and second sets of balls and thereby move the balls radially inwardly and into engagement with the valve stem. When the valve stem is secured within the chuck assembly, the spindle is "locked" within the sleeve member so that the spindle cannot rotate relative to the sleeve member.

In the preferred embodiment of the invention, the sleeve member is rotated by rotating the spindle. More particularly, the chuck assembly includes a pulley mounted on the spindle, a drive pulley drivingly connected to the spindle pulley by a belt, and a variable speed motor drivingly connected to the drive pulley and mounted on the housing.

A principal feature of the invention is the manner in which the inner surfaces of the sleeve member, the spindle and the collar are machined. Because these inner surfaces are machined by rotating the parts within the housing, the inner surfaces are precisely centered on the axis of rotation of the chuck assembly. This causes the balls, and therefore the valve stem, to also be centered on the axis of rotation. This reduces the run-out of the chuck assembly.

For mass production purposes, sleeve members are machined in their own bearings and housings, while spindles and collars are machined on a master sleeve member supported by its own bearings and housing. When a chuck assembly wears out, the spindle and collar can simply be replaced by new parts. It is not necessary to send any parts to the manufacturer to be rebuilt. Because the spindles and collars are machined on a master sleeve, it is not necessary to put each housing and sleeve member through the process of machining a spindle and a collar. This greatly simplifies the manufacturing process.

Other features and advantages of the invention will become apparent to those skilled in the art upon review of the following detailed description, claims and drawings.

DESCRIPTION OF THE DRAWINGS

FIG. 2 is a side elevational view, partially in section, of the chuck assembly.

FIG. 3 is a right elevational end view of the chuck assembly as shown in FIG. 2.

Figure 1:
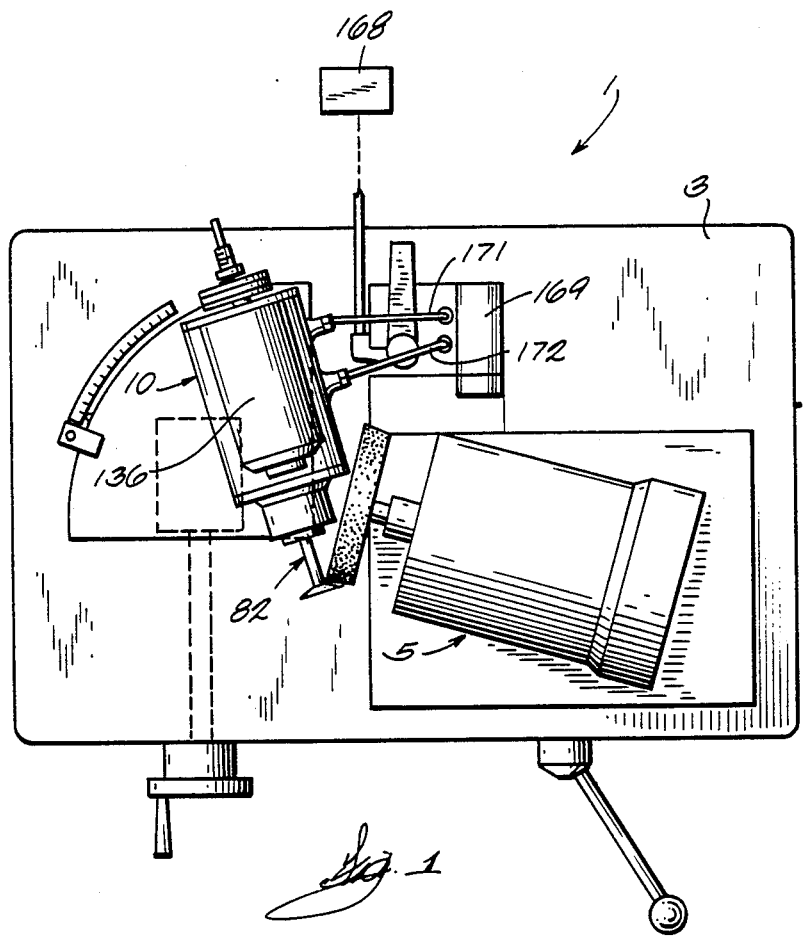
FIG. 1 is a plan view of a valve resurfacing apparatus embodying the invention and including a chuck assembly.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A valve resurfacing apparatus 1 embodying the invention is illustrated in the drawings. As shown in FIG. 1, the apparatus 1 comprises a base 3, a grinding wheel 5 mounted on the base 3, and a chuck assembly 10 mounted on the base 3.

As shown in FIG. 2, the chuck assembly 10 comprises a housing 12 having right and left ends 14 and 16, respectively. The right end 14 of the housing 12 has therein a cylindrical bore 18, and the left end 16 of the housing 12 has therein a cylindrical bore 20 coaxial with the bore 18. The bores 18 and 20 are partially separated by a wall 22 having therethrough a bore 24 coaxial with and connecting the bores 18 and 20. The chuck assembly 10 also comprises an end cap 26 mounted on the left end 16 of the housing 12 and sealingly closing the left end of the bore 20 so as to define a cylinder 28. The end cap 26 has an outer 30 surface and can be considered to be part of the housing 12.

The chuck assembly 10 also comprises an annular sleeve member or slide housing 32 including an inner surface 33 defining a generally cylindrical bore 34. The sleeve member 32 also includes an outer surface 36 which is externally threaded adjacent the left end of the sleeve member 32 and which includes a shoulder 38. The assembly 10 also comprises bearing means supporting the sleeve member 32 within the housing 12, i.e., within the bore 18, for rotation about an axis 40. While various suitable bearing means can be employed, in the preferred embodiment, the bearing means includes a pair of axially spaced bearings 42 and 44 located between the sleeve member 32 and the housing 12 and spaced apart by a pair of concentric, annular spacers 46 and 48. The bearings 42 and 44 and the spacers 46 and 48 are secured on the sleeve member 32 by a locking nut 50 which is threaded onto the left end of the sleeve member 32 so that the bearings 42 and 44 and the spacers 46 and 48 are trapped between the locking nut 50 and the shoulder 38. Preferably, a washer 52 is located between the locking nut 50 and the left bearing 42. The left bearing 42 is spaced from the wall 22 by an annular spacer 54, and a spacer 56 is located to the right of the right bearing 44. As shown in FIG. 1, the spacers 46, 48, 54 and 56 and the bearings 42 and 44 are secured in the bore 18 by a bearing retainer 58. An annular seal 60 is located between the bearing retainer 58 and the outer surface 36 of the sleeve member 32.

The assembly 10 also comprises a plunger or spindle 62 slideably housed within the sleeve member bore 34 and moveable relative to the sleeve member 32 along the axis 40. The spindle 62 extends through the end cap 26, and a bushing 64 and an O-ring 66 are located between the end cap 26 and the spindle 62. The spindle 62 includes an end portion 68 (the right end in FIG. 2) having an outer diameter substantially equal to the inner diameter of the sleeve member bore 34 so that there is a precision sliding fit between the spindle 62 and the sleeve member 32, and the spindle 62 includes an outer surface 70 which is externally threaded adjacent the left end of the spindle 62, which has thereon a shoulder 72 and which has therein an axially extending slot 74. The reasons for the external threading and the slot 74 are explained hereinafter. Also, the spindle 62 has therethrough an axial bore 76.

The assembly 10 also comprises a rod-like valve stop 78 slideably housed in the spindle bore 76. The valve stop 78 includes a conical right end and a left end extending outwardly of the left end of the spindle 62. A pair of O-rings 80 provide a friction fit between the valve stop 78 and the spindle 62 so that the valve stop 78 will not move relative to the spindle 62 unless an axial force is applied to the valve stop 78.

The assembly 10 further comprises means for securing the valve stem 81 of a valve member 82 within the sleeve member bore 34 in response to axial movement of the spindle 62 relative to the sleeve member 32. While various suitable securing means can be used, in the illustrated construction, such means includes first and second or left and right axially spaced sets 84 and 86, respectively, of balls 88. Preferably, each set 84 and 86 includes three balls 88. The securing means also includes means for supporting both sets of balls 88 for radial movement relative to the sleeve member 32 and so that the balls 88 of each set are circumferentially spaced around the axis 40. In the preferred embodiment, the means for supporting the balls 88 includes a ball holder or carriage 90 slideably housed within the sleeve member bore 34. The ball carriage 90 has therethrough a bore 92 centered on the axis 40 and adapted to receive the valve stem 81. The ball carriage 90 includes (see FIG. 4) a cylindrical central portion 94 slideably housed in the sleeve member bore 34 and having an outer diameter substantially equal to the inner diameter of the bore 34. The ball carriage 90 also includes opposite cylindrical end portions 96 and 98 extending from the central portion 94 and having outer diameters less than the inner diameter of the bore 34. The left end portion 96 has therethrough three radially extending bores 100 spaced 120° apart. Each of the bores 100 houses one of the balls 88 of the left set 84. The right end portion 98 has therethrough three radially extending bores 102 spaced 120° apart. Each of the bores 102 houses one of the balls 88 of the right set 86.

The means for securing the valve stem 81 also includes means for moving the balls 88 radially inwardly toward the axis 40 and into engagement with the valve stem 81 in response to axial movement of the spindle 62 relative to the sleeve member 32. More particularly, in the preferred embodiment, the balls 88 move radially inwardly and into engagement with the valve stem 81 in response to movement of the spindle 62 to the right as shown in FIG. 2. While various suitable means for moving the balls 88 can be employed, in the preferred embodiment, such means includes ramp surfaces 104 on the spindle 62 for engaging the left set 84 of balls 88, and ramp surfaces 106 on the sleeve member 32 for engaging the right set 86 of balls 88.

More particularly, in the preferred embodiment, the spindle 62 includes an inner surface 108 which defines a frustoconical bore in the spindle 62 and which provides the ramp surfaces 104. In the illustrated construction, the frustoconical bore defined by the inner surface 108 communicates with a cylindrical bore 110 having an end wall 112. Also, the sleeve member 32 has fixedly mounted thereon an annular collar 114 including a second inner surface 116 which provides the ramp surfaces 106 and which defines a second frustoconical bore centered on the axis 40. The angle defined by the inner surface 116 and the axis 40 is substantially identical to the angle defined by the inner surface 108 and the axis 40, and is preferably 30°.

The collar 114 can be secured to the sleeve member 32 by any suitable means, such as by screws 118. Preferably, the collar 114 has thereon a rubber boot or dust cover 120 having therein an aperture 122 centered on the axis 40 and adapted to receive the valve stem 81.

The assembly 10 also comprises means for biasing the ball carriage 90 away from the spindle 62, i.e., to the right relative to the spindle 62. While various suitable biasing means can be used, in the illustrated construction, such means includes a spring 124 located within the spindle bore 110 between the end wall 112 and the ball carriage 90. The reason for the spring 124 is explained hereinafter.

The assembly 10 further comprises means for rotating the sleeve member 32 about the axis 40. While various suitable rotating means can be used, in the preferred embodiment, such means includes means for rotating the spindle 62 about the axis 40. As will be explained more fully hereinafter, forces acting through the balls 88, the ball carriage 90 and the collar 114 cause common rotation of the sleeve member 32 with the spindle 62 when a valve stem 81 is engaged by the balls 88. While various suitable means can be used for rotating the spindle 62, in the illustrated construction, such means includes (see FIG. 2) a pulley 126 which is fixed to the spindle 62 for rotation therewith and which is movable relative to the spindle 62 along the axis 40. Preferably, the pulley 126 has therein a slot 128 mating with the slot 74 in the spindle 62, and a key 130 extends into both slots 74 and 128 to prevent rotation of the pulley 126 relative to the spindle 62 while permitting axial movement of the pulley 126 relative to the spindle 62. The means for rotating the spindle 62 also includes a drive pulley 132 drivingly connected to the pulley 126 by a belt 134, and a variable speed motor 136 drivingly connected to the drive pulley 132 and mounted on the housing 12 by a mounting bracket 138.

The assembly 10 also comprises means for biasing the pulley 126 against the outer surface 30 of the end cap 26. While various suitable biasing means can be used, in the illustrated construction, such means includes a retaining ring or member 140 threaded onto the left end of the spindle 62, and a spring 142 extending between the ring 140 and the pulley 126.

The assembly 10 further comprises means for moving the spindle 62 relative to the sleeve member 32 and along the axis 40. While various suitable means can be employed, in the preferred embodiment, such means includes a piston 144 slideably housed in the cylinder 28 and secured to the spindle 62 for common movement therewith along the axis 40. As shown in FIG. 2, the piston 144 surrounds the spindle 62 and an O-ring 146 seals the joint between the spindle 62 and the piston 144. The piston includes a first or left portion 148 slideably housed in the cylinder 28, and a second or right portion 150 extending through the bore 24. A quad ring 152 seals the joint between the left portion 148 and the housing 12, and an O-ring 154 seals the joint between the right portion 150 and the housing 12. A thrust bearing 156 is located between the right portion 150 and the spindle shoulder 72, and the piston 144 and the thrust bearing 156 are trapped against the shoulder 72 by a retaining ring 158 so that the piston 144 cannot move axially of the spindle 62.

The piston 144 divides the cylinder 28 into first and second or left and right chambers 160 and 162, respectively, and the means for moving the spindle 62 also includes means for supplying pressurized fluid to the chambers 160 and 162. Preferably, the means for supplying pressurized fluid includes, in the housing 12, first and second passageways 164 and 166 respectively communicating with the chambers 160 and 162, and a source of compressed air 168 (shown schematically in FIG. 3) selectively and alternatively communicable with the passageways 164 and 166. In the preferred embodiment, the source of compressed air 168 is located remotely from the apparatus 1, and the apparatus 1 comprises (see FIG. 1) valve means 169 communicating with the source 168 and communicating with the passageways 164 and 166 via conduits 171 and 172, respectively. Preferably, the valve means 169 is mounted on the base 3. When compressed air is supplied to the first passageway 164, the piston 144 and the spindle 62 move to the right relative to the housing 12 and the sleeve member 32. When compressed air is supplied to the second passageway 166, the piston 144 and the spindle 62 move to the left relative to the housing 12 and the sleeve member 32.

Figure 4:
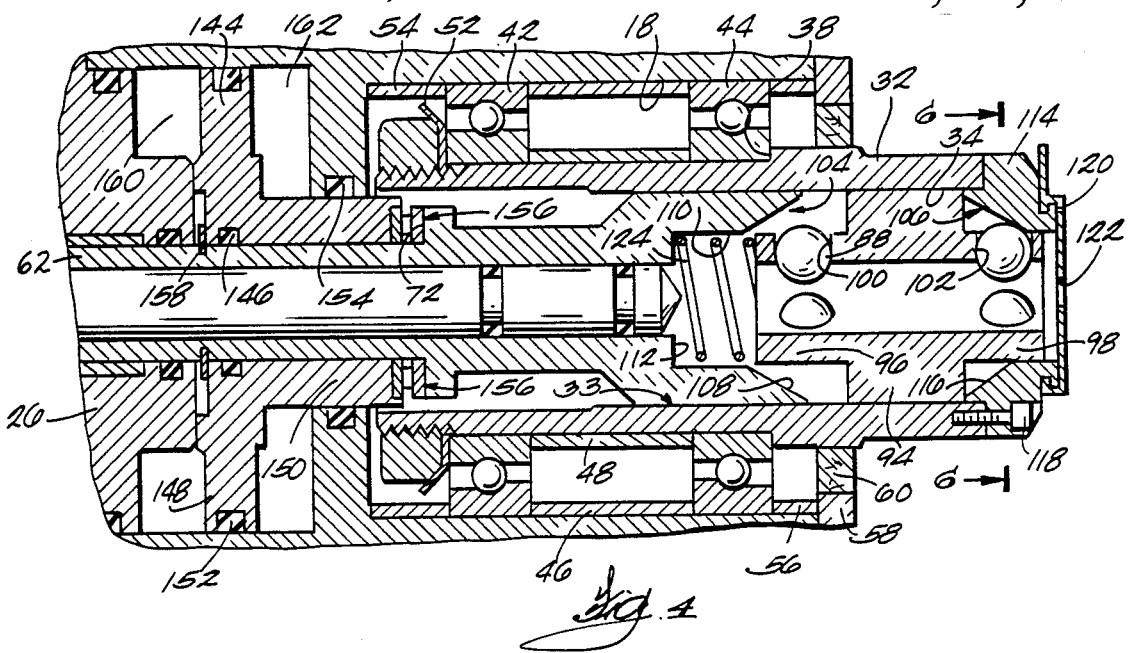
FIG. 4 is an enlarged, partial sectional view of the chuck assembly.
Figure 5:
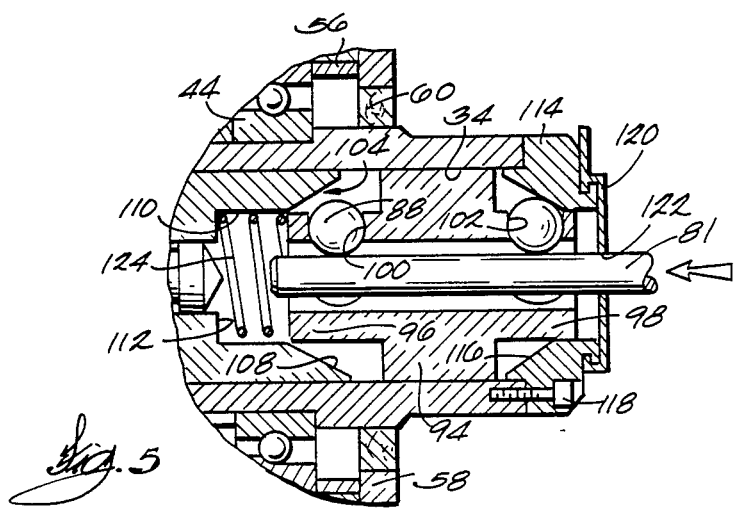
FIG. 5 is a partial view similar to FIG. 4 showing a valve stem being inserted into the chuck assembly.
Figure 6:
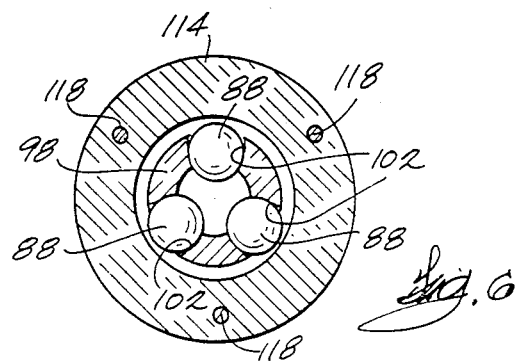
FIG. 6 is a cross sectional view taken along line 6—6 in FIG. 4.

When the spindle 62 is moved all the way to the left, as shown in FIG. 4, the spring 124 biases the ball carriage 90 to the right relative to the spindle 62 so that the left set 84 of balls 88 is out of engagement with the spindle 62 and so that the right set 86 of balls 88 engages the collar 114. When a valve stem 81 is inserted into the assembly 10, as shown in FIG. 5, the valve stem 81 moves the right set 86 of balls 88 radially outwardly, and engagement of the right set of balls 88 with the collar 114 causes the ball carriage 90 to move to the left relative to the sleeve member 32 and the spindle 62 and against the force of the spring 124. By biasing the ball carriage 90 to the right relative to the spindle 62, the spring 124 keeps the left set 84 of balls 88 out of engagement with the spindle 62 and prevents the left set of balls 88 from "locking up" when a valve stem 81 is inserted. If the spring 124 were not employed, insertion of a valve stem 81 could cause the ball carriage 90 to move to the left relative to the spindle 62 and could then cause the left set 84 of balls 88 to engage the spindle 62 and thereby prevent further insertion of the valve stem 81 before the valve stem 81 is fully inserted.

After the valve stem 81 is fully inserted, compressed air is supplied to the first chamber 160 in order to move the piston 144 and the spindle 62 to the right or toward the collar 114. Such movement of the spindle 62 forces the right set 86 of balls 88 against the inner surface 116 of the collar 114 and forces the left set 84 of balls 88 against the inner surface 108 of the spindle 62. This forces both sets of balls 88 radially inwardly and into engagement with the valve stem 81, as shown in FIG. 2. When the spindle 62 is moved to the right, as shown in FIG. 2, the valve stem 81 is secured by the balls 88, and forces acting through the balls 88, the ball carriage 90 and the collar 114 prevent rotation of the sleeve member 32 relative to the spindle 62. In other words, the sleeve member 32 will rotate with the spindle 62. After the valve stem 81 is securely engaged, the valve stop 78 is moved to the right relative to the spindle 62 until the right end of the valve stop 78 engages the left end of the valve stem 81. When subsequent valve members are inserted into the apparatus 10, the valve stop 78 will aid in properly positioning the valve members in the assembly 10.

A key feature of the invention is the manner in which certain parts of the chuck assembly 10 are finished and assembled. Preferably, the inner surfaces of the sleeve member 32, the spindle 62 and the collar 114 are not finished before the apparatus 10 is assembled. On the other hand, the ball carriage 90 is finished prior to assembly, and the outer surface of the end portion 68 of the spindle 62 is finished prior to assembly.

The assembly 10 is assembled and finished as follows. First, the sleeve member 32 and the bearings 42 and 44 are mounted in the housing 12 and are secured in place by the bearing retainer 58. Next, while the sleeve member 32 is rotated about the axis 40, the inner surface 33 of the sleeve member 32 is machined or ground to its finished dimensions. For this step of the manufacturing process, the sleeve member 32 can be rotated by any suitable means. Preferably, the sleeve member 32 is rotated by a flat belt wound around the "snout" of the sleeve member 32, i.e., the portion of the sleeve member 32 extending from the right end 14 of the housing 12. The belt can be driven by any suitable means. Preferably, as mentioned previously, the inner diameter of the sleeve member 32 and the outer diameter of the spindle end portion 68 are substantially identical, so that the spindle 62 is slideably housed within the sleeve member 32 without any "wobbling" of the spindle 62 relative to the sleeve member 32.

Next, the spindle 62 is housed in the sleeve member 32, and the inner surface 108 of the spindle 62 is machined to its finished dimensions while the spindle 62 is rotated about the axis 40. Preferably, the spindle 62 is secured to the sleeve member 32 and the sleeve member 32 is rotated as described above. The spindle 62 can be secured to the sleeve member 32 by suitable means. Preferably, a set-up ring (not shown) is mounted on the right end of the sleeve member 32 in place of the collar 114. The spindle 62 is located within the sleeve member 32 such that the end portion 68 of the spindle 62 extends through the set-up ring, and the set-up ring has therethrough a plurality of radially extending set screws that can be tightened to secure the spindle 62 relative to the set-up ring and thus relative to the sleeve member 32.

Next, the collar 114 is mounted on the sleeve member 32, and the inner surface 116 of the collar 114 is machined to its finished dimensions while the collar 114 and the sleeve member 32 are rotated about the axis 40.

After the sleeve member 32, the spindle 62 and the collar 114 are finished, the collar 114 is temporarily removed and the ball carriage 90, the balls 88 and the spring 124 are inserted into the sleeve member 32.

It should be understood that the spindle 62 and the collar 114 can be machined in either order, i.e., the collar 114 can be machined before the spindle 62.

Because the inner surfaces of the sleeve member 32, the spindle 62 and the collar 114 are machined as described above, they are precisely centered on the axis 40. This causes a valve stem 81 engaged by the chuck assembly 10 to be precisely centered on the axis 40 and therefore reduces run-out of the valve.

For mass production purposes, sleeve members 32 are machined in their own bearings 42 and 44 and housings 12, while spindles 62 and collars 114 are machined in or on a master sleeve member 32 supported by bearings 42 and 44 and a housing 12. Therefore, it is not necessary to put each housing 12 and sleeve member 32 through the process of machining a spindle 62 and a collar 114. Also, when the spindle 62 and collar 114 wear out, they can be replaced by new parts. It is not necessary to return parts to the manufacturer to be rebuilt.

Various features of the invention are set forth in the following claims.

We claim:
1. A valve resurfacing apparatus comprising
a base,
a chuck assembly mounted on said base and including a housing, a sleeve member having therein a bore centered on an axis, bearing means supported by said housing and supporting said sleeve member for rotation about said axis, a plunger slideably housed within said bore and moveable relative to said sleeve member along said axis, means for securing the stem of a valve within said bore in response to axial movement of said plunger relative to said sleeve member, said securing means including first and second axially spaced sets of balls, means for supporting said balls within said bore so that said balls are circumferentially spaced around said axis and so that said first set of balls is spaced axially from said second set of balls, and means for moving said balls radially inwardly toward said axis and into engagement with the valve stem in response to axial movement of said plunger relative to said sleeve, said means for moving said balls radially inwardly including a first frustoconical bore surface supported by said plunger and adapted to engage the first set of balls for moving the balls inwardly and a second frustoconical bore surface adapted to engage the second set of balls for moving the balls of the second set inwardly and means for rotating said sleeve member and the valve about said axis, and
means mounted on said base for resurfacing the valve.

2. An apparatus as set forth in claim 1 wherein said means for supporting said balls supports said balls for radial movement relative to said sleeve member.

3. An apparatus as set forth in claim 1 and further comprising means for moving said plunger relative to said sleeve member along said axis.

4. An apparatus as set forth in claim 3 wherein said means for moving said plunger includes a cylinder defined by said housing, a piston slideably housed in said cylinder, secured to said plunger for common movement therewith along said axis and dividing said cylinder into first and second chambers, and means for supplying pressurized fluid to at least one of said chambers.

5. An apparatus as set forth in claim 1 wherein said means for rotating said sleeve member includes means connected directly to said plunger for rotating said plunger about said axis.

6. An apparatus as set forth in claim 5 wherein said means for rotating said plunger includes a pulley fixed directly to said plunger for rotation therewith about said axis and moveable relative to said plunger along said axis, and means for rotating said pulley.

7. An apparatus as set forth in claim 6 wherein said housing includes an end surface, wherein said pulley is located exteriorly of said housing and adjacent said end surface, and wherein said apparatus further comprises means for biasing said pulley against said end surface.

8. An apparatus as set forth in claim 1 wherein said sleeve includes a second inner surface defining said second frustoconical bore surface.

9. An apparatus as set forth in claim 8 wherein said bore has a diameter, and wherein said means for supporting said balls includes a ball carriage having therethrough a bore centered on said axis and adapted to receive the valve stem, said ball carriage including a cylindrical central portion slideably housed in said bore between said plunger and said second inner surface, and said ball carriage also including opposite cylindrical end portions extending from said central portion and having diameters less than said diameter of said bore, one of said end portions being housed in said first frustoconical bore and having therethrough radially extending bores housing said first set of balls, and the opposite end portion extending into said second frustoconical bore and having therethrough radial bores housing said second set of balls.

10. An apparatus as set forth in claim 9 and further comprising means for biasing said ball carriage away from said plunger.

11. An apparatus as set forth in claim 8 wherein said balls move radially inwardly in response to movement of said plunger toward said second inner surface.

12. An apparatus as set forth in claim 8 wherein said first mentioned frustoconical inner surface faces said second frustoconical inner surface.

13. An apparatus for engaging the stem of a valve member and for rotating the valve member about an axis, said apparatus comprising
a housing,
bearing means within said housing,
a sleeve member supported by said bearing means for rotation about an axis, said sleeve member having therein a cylindrical bore centered on said axis and machined by rotating said sleeve member about said axis,
a spindle slideably housed within said bore for movement relative to said sleeve member along said axis, said spindle including a first inner surface defining a frustoconical bore centered on said axis, said first inner surface being machined by rotating said spindle in said sleeve and about said axis,
a collar mounted on said sleeve member for common rotation therewith about said axis, said collar including a second inner surface defining a second frustoconical bore centered on said axis said second frustoconical bore being in spaced opposed facing relation with respect to said frustoconical bore of said first inner surface, said second inner surface being machined by rotating said sleeve member and said collar about said axis,
first and second axially spaced sets of balls located within said bore,
means for supporting said first set of balls for radial movement relative to said sleeve member and for engagement with said first inner surface,
means for supporting said second set of balls for radial movement relative to said sleeve member and for engagement with said second inner surface,
means for moving said spindle relative to said sleeve member and along said axis so that said inner surface on said spindle engages said first set of balls and so that said inner surface on said collar engages said second set of balls, and
means for rotating said spindle about said axis.

14. An apparatus for engaging a workpiece and for rotating the workpiece, said apparatus comprising
a housing,
a sleeve member having therein a bore centered on an axis,
bearing means supported by said housing and supporting said sleeve member for rotation about said axis,
a plunger slideably housed within said bore and moveable relative to said sleeve member along said axis,
means for securing the workpiece within said bore in response to axial movement of said plunger relative to said sleeve member, said securing means including first and second axially spaced sets of balls, means for supporting said balls within said bore so that said balls are circumferentially spaced around said axis and so that said first set of balls is spaced axially from said second set of balls, and means for moving said balls radially inwardly toward said axis and into engagement with the workpiece in response to axial movement of said plunger relative to said sleeve member, said means for moving said balls radially inwardly including a first frustoconical bore surface supported by said plunger and adapted to engage the first set of balls for moving the balls inwardly and a second frustoconical bore surface adapted to engage the second set of balls for moving the balls of the second set inwardly, and
means for rotating said sleeve member about said axis.

15. An apparatus as set forth in claim 14 wherein said bore has a diameter, and wherein said means for supporting said balls includes a ball carriage having therethrough a bore centered on said axis and adapted to receive the workpiece, said ball carriage including a cylindrical central portion slideably housed in said bore between said plunger and said second inner surface, and said ball carriage also including opposite cylindrical end portions extending from said central portion and having diameters less than said diameter of said bore, one of said end portions being housed in said first frustoconical bore and having therethrough radially extending bores housing said first set of balls, and the opposite end portion extending into said second frustoconical bore and having therethrough radial bores housing said second set of balls.

16. An apparatus as set forth in claim 15 and further comprising means for biasing said ball carriage away from said plunger.

17. An apparatus as set forth in claim 14 wherein said balls move radially inwardly in response to movement of said plunger toward said second inner surface.

18. An apparatus as set forth in claim 14 wherein said means for supporting said balls supports said balls for radial movement relative to said sleeve member.

19. An apparatus as set forth in claim 14 and further comprising means for moving said plunger relataive to said sleeve member along said axis.

20. An apparatus as set forth in claim 19 wherein said means for moving said plunger includes a cylinder defined by said housing, a piston slideably housed in said cylinder, secured to said plunger for common movement therewith along said axis and dividing said cylinder into first and second chambers, and means for supplying pressurized fluid to at least one of said chambers.

21. An apparatus as set forth in claim 14 wherein said means for rotating said sleeve member includes means connected directly to said plunger for rotating said plunger about said axis.

22. An apparatus as set forth in claim 21 wherein said means for rotating said plunger includes a pulley fixed directly to said plunger for rotation therewith about said axis and moveable relative to said plunger along said axis, and means for rotating said pulley.

23. An apparatus as set forth in claim 22 wherein said housing includes an end surface, wherein said pulley is located exteriorly of said housing and adjacent said end surface, and wherein said apparatus further comprises means for biasing said pulley against said end surface.

24. An apparatus as set forth in claim 14 wherein said first mentioned frustoconical inner surface faces said second frustoconical inner surface.

25. A valve resurfacing apparatus comprising
a base,
a chuck assembly mounted on said base and including a housing, a sleeve member having therein a bore centered on an axis, bearing means supported by said housing and supporting said sleeve member for rotation about said axis, a plunger slideably housed within said bore and moveable relative to said sleeve member along said axis, means for securing the stem of a valve within said bore in response to axial movement of said plunger relative to said sleeve member, and means for rotating said sleeve member and the valve about said axis, said means for rotating said sleeve member including means connected directly to said plunger for rotating said plunger about said axis, and
means mounted on said base for resurfacing the valve.

26. An apparatus for engaging a workpiece and for rotating the workpiece, said apparatus comprising
a housing,
a sleeve member having therein a bore centered on an axis,
bearing means supported by said housing and supporting said sleeve member for rotation about said axis,
a plunger slideably housed within said bore and moveable relative to said sleeve member along said axis,
means for securing the workpiece within said bore in response to axial movement of said plunger relative to said sleeve member, and
means for rotating said sleeve member about said axis, said means for rotating said sleeve member including means connected directly to said plunger for rotating said plunger about said axis.

27. An apparatus for engaging a workpiece and for rotating the workpiece, said apparatus comprising
a housing,
a sleeve member having therein a bore centered on an axis,
bearing means supported by said housing and supporting said sleeve member for rotation about said axis,
means for securing the workpiece within said bore, said securing means including first and second axially spaced sets of balls circumferentially spaced around said axis, means defining a first frustoconical inner surface and a second frustoconical inner surface facing said first frustoconical inner surface, means for supporting said first set of balls for radial movement relative to said sleeve and for engagement with said first frustoconical inner surface, means for supporting said second set of balls for radial movement relative to said sleeve and for engagement with said second frustoconical inner surface, and means for causing engagement of said first and second frustoconical surfaces with said first and second sets of balls, respectively, and
means for rotating said sleeve member about said axis.

28. A valve resurfacing apparatus comprising
a base,
a chuck assembly mounted on said base and including a housing, a sleeve member having therein a bore centered on an axis, bearing means supported by said housing and supporting said sleeve member for rotation about said axis, a plunger slideably housed within said bore and moveable relative to said sleeve member along said axis, means for securing the stem of a valve within said bore in response to axial movement of said plunger relative to said sleeve member, said securing means including a first plurality of bearing members and a second plurality of bearing members spaced axially from said first plurality of bearing members, means for supporting said bearing members within said bore so that said bearing members are circumferentially spaced around said axis, the means for supporting the bearing members including a carriage housed within said bore and having a central bore adapted to house the valve stem, and the carriage supporting the first plurality of bearing members in spaced apart relation around the valve stem and supporting the second plurality of bearing members in spaced apart relation around the valve stem and means for causing said bearing members to move radially inwardly toward said axis and into engagement with the valve stem in response to axial movement of said plunger relative to said sleeve member, said means for causing the bearing members to move radially inwardly including a first ramp surface supported by said sleeve member and engaging said first plurality of bearing members to force said bearing members inwardly in response to axial movement of the plunger toward the first ramp surface of the sleeve member and a second ramp surface supported by the plunger and engaging the second plurality of bearing members to force said bearing members inwardly in response to axial movement of the plunger toward the first ramp portion and means for rotating said sleeve member and the valve about said axis, and
means mounted on said base for resurfacing the valve.

29. A valve resurfacing apparatus as set forth in claim 28 wherein said first ramp surface is positioned in opposed facing spaced apart relation with respect to said second ramp surface.

30. An apparatus for engaging the stem of a valve member and for rotating the valve member about an axis, said apparatus comprising a housing, bearing means within said housing a sleeve member supported by said bearing means for rotation about an axis, said sleeve member having therein a cylindrical bore centered on said axis and machined for rotating said sleeve member about said axis, a spindle slideably housed within said bore for movement relative to said sleeve member along said axis, said spindle including a first inner surface defining a frustoconical bore centered on said axis, said first inner surface being machined by rotating said spindle in said sleeve and about said axis, a collar mounted on said sleeve member for common rotation with said sleeve member about said axis, said collar including a second inner surface defining a second frustoconical bore centered on said axis, said second inner surface being machined by rotating said sleeve member and said collar about said axis, a bearing member carriage means housed in said cylindrical bore between said first inner surface and said second inner surface, first and second axially spaced sets of bearing members located within said bore and supported by said bearing member carriage, said first set of bearing members being supported by said carriage for radial movement relative to said sleeve member, said first surface being engageable with said first set of bearing members to force said bearing members against the stem of a valve member when the spindle moves toward the collar, and the second set of bearing members being supported by the carriage for radial movement relative to said sleeve member, said second inner surface being engageable with the second set of bearing members to force said bearing members against the stem of a valve member when the spinkle moves toward the collar, means for moving said spindle relative to said sleeve member and along said axis so that said first inner surface on said spindle engages said first set of bearing members and so that said second inner surface on said collar engages said second set of bearing members, and means for rotating said spindle about said axis.

* * * * *